(No Model.)  
3 Sheets—Sheet 1.

J. E. LEADLEY & J. HANLON.
GAS GENERATOR.

No. 269,798. Patented Dec. 26, 1882.

Attest:  
T. Walter Fowler  
H. B. Applewhaite

Inventor:  
Jas. E. Leadley  
John Hanlon  
by A. H. Evans & Co.

(No Model.) J. E. LEADLEY & J. HANLON. 3 Sheets—Sheet 2.
GAS GENERATOR.
No. 269,798. Patented Dec. 26, 1882.
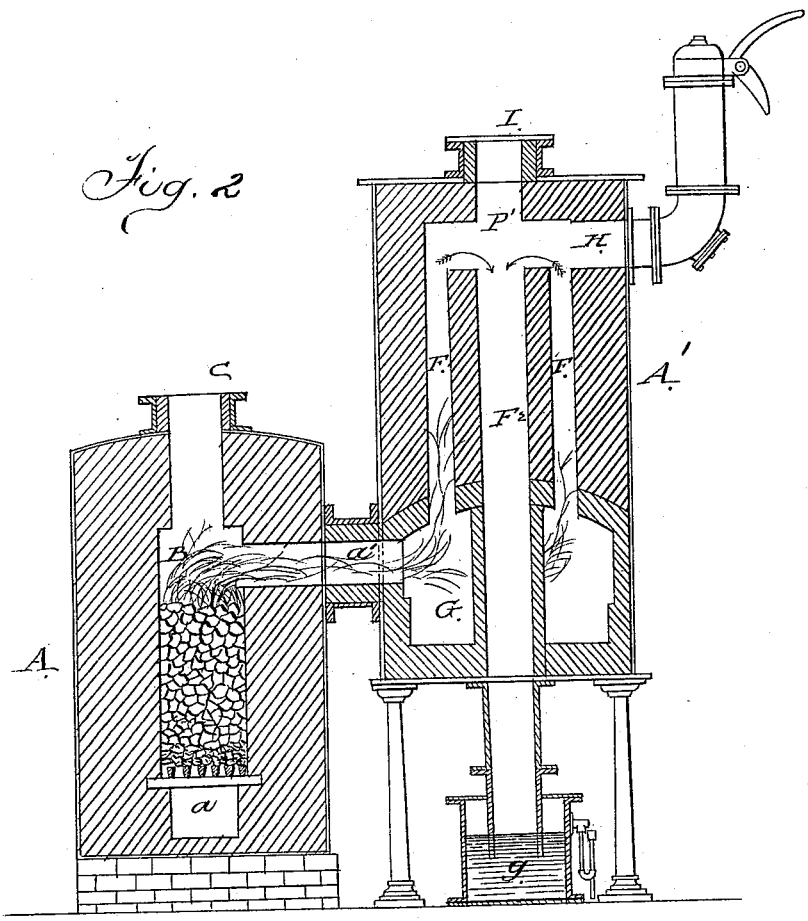
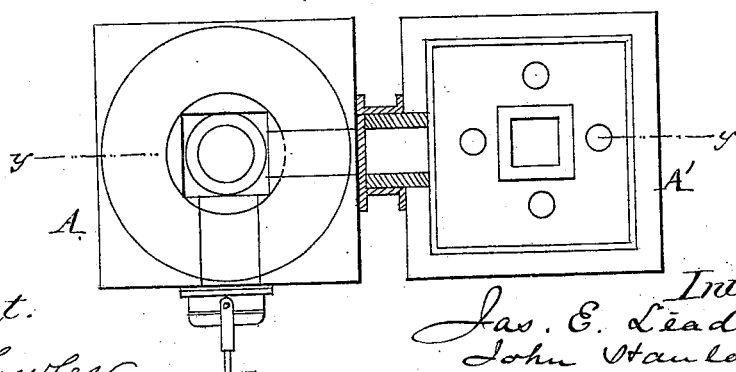

(No Model.) 3 Sheets—Sheet 3.

J. E. LEADLEY & J. HANLON.
GAS GENERATOR.

No. 269,798. Patented Dec. 26, 1882.

Attest:
D. Walter Fowler,
H. B. Applewhaite.

Inventor:
Jas. E. Leadley
John Hanlon
by A. H. Evans & Co.
attys.

UNITED STATES PATENT OFFICE.

JAMES E. LEADLEY, OF CAMDEN, NEW JERSEY, AND JOHN HANLON, OF NEW YORK, N. Y., ASSIGNORS TO THE UNITED GAS IMPROVEMENT COMPANY, OF PHILADELPHIA, PENNSYLVANIA.

GAS-GENERATOR.

SPECIFICATION forming part of Letters Patent No. 269,798, dated December 26, 1882.

Application filed July 12, 1882. (No model.)

*To all whom it may concern:*

Be it known that we, JAMES E. LEADLEY, of Camden, in the county of Camden and State of New Jersey, and JOHN HANLON, of the city and county of New York, in the State of New York, have invented a new and Improved Gas-Generator; and we hereby declare the following to be a full, clear, and exact description thereof, reference being had to the accompanying drawings, making part of this specification, in which—

Figure 1:
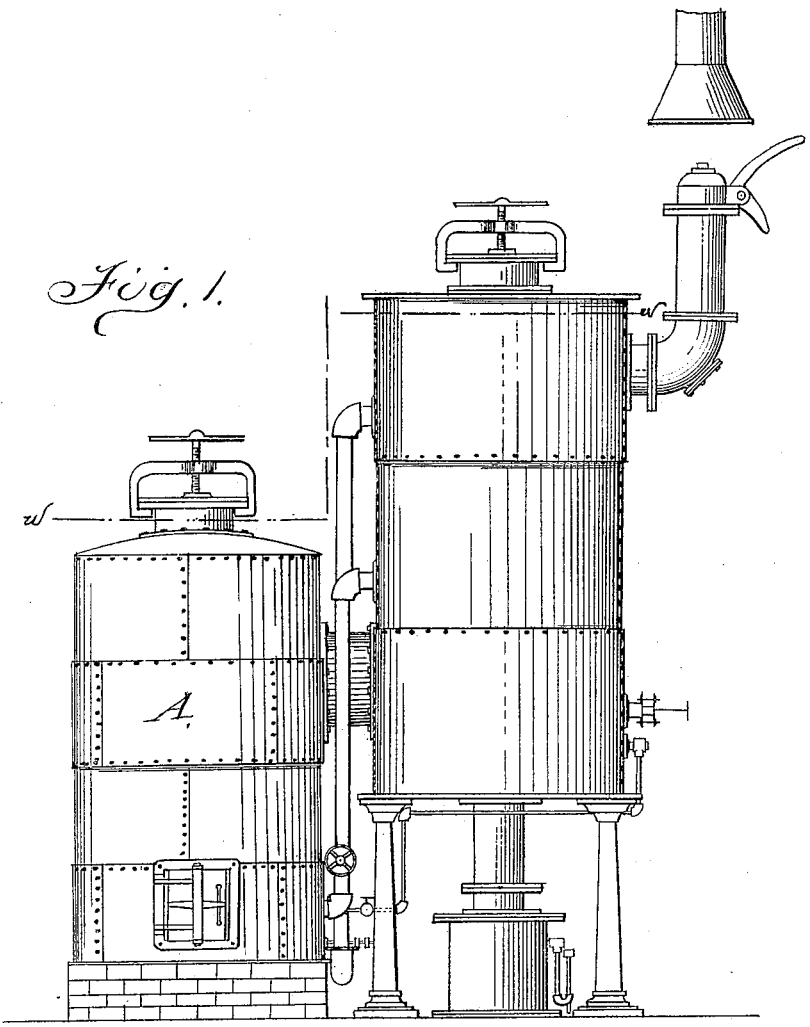
Figure 5:
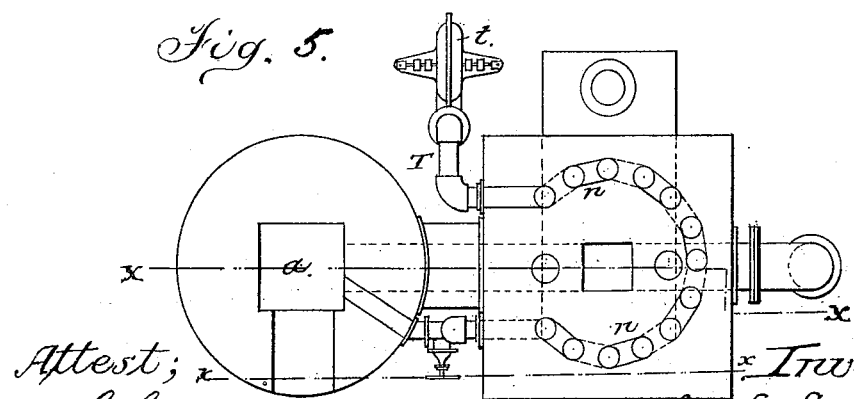
Figure 3:
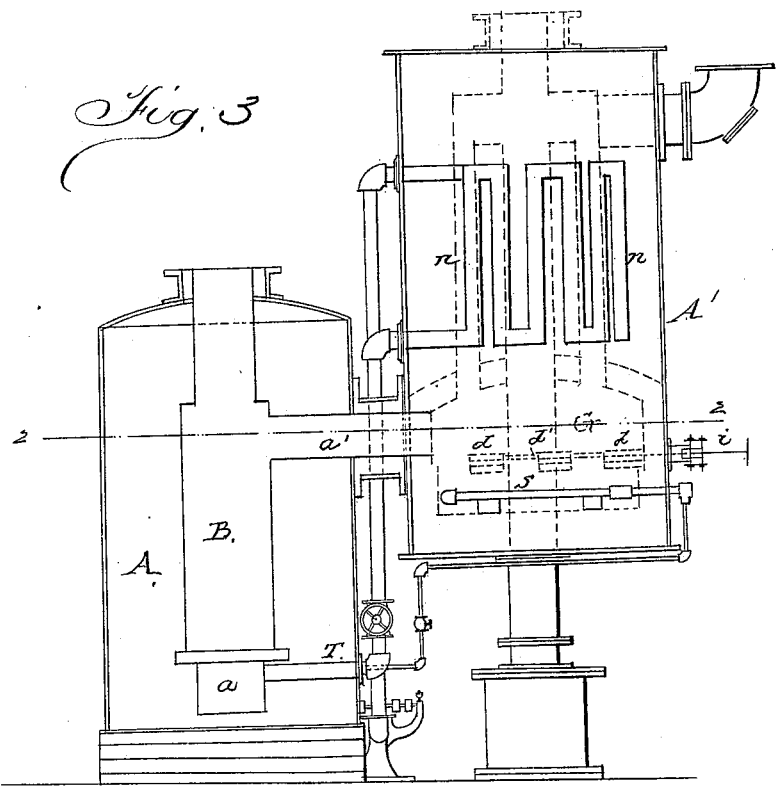
Figure 4:
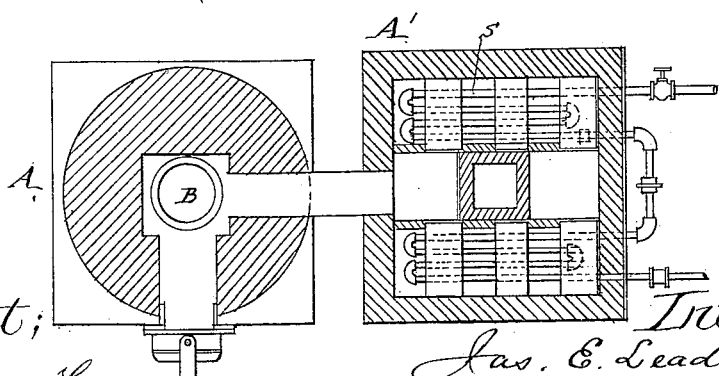

Figure 1 is an elevation of the apparatus. Fig. 2 is a vertical section on line $y\ y$ of Fig. 6. Fig. 3 is a vertical section on the line $x\ x$ of Fig. 5. Fig. 4 is a horizontal section on the line $z\ z$ of Fig. 3. Fig. 5 is a horizontal sectional view on line $w\ w$, Fig. 1. Fig. 6 is a view partially in horizontal section and partially in plan.

Our invention relates to an apparatus for generating gas to be used preferably for heating purposes, and has for its object to provide a generator wherein the construction is conducive to economy of fuel and the certain production of a good gas, for the purposes desired.

Our invention consists in certain details of construction and combinations of devices, as will hereinafter be fully described, and specifically pointed out in the claims.

In the said drawings, A is the generator proper, and B the fire-chamber thereof, and $a$ the pit beneath the fire-chamber. The superheater A' is provided with a passage, $a'$, connecting its interior uptake-flues, F F, and lower chamber, G, with the fire-chamber of the generator A. Centrally located between flues F F is a main gas-flue, $F^2$, which passes through the bottom of superheater A' into a washing-chamber, $g$, containing a body of water, below the surface of which is the mouth of said flue $F^2$. After the gas rises through the water it escapes through a proper supply-pipe to the point of consumption. Near the upper end of the superheater the chamber P' is formed, and is connected with a draft-flue, H, and on top of the superheater is a man-hole, I, closed by a suitable cover. The top of the generator is also provided with a secure cover, C. An air-pipe, T, passes from a fan-blower, $t$, into the superheater, and is arranged around pipes or flues F F in a circular vertical coil, $u\ u$, and thence passes into the pit $a$ beneath the generator fire-chamber. From some convenient point steam is conducted through a pipe, S, arranged in a coil on or near the bottom of chamber G, and thence out to the elbow, where air-pipe T enters pit $a$, and the steam-pipe is introduced into the larger or air pipe T. The products of combustion from the fire-chamber $a$, rushing into chamber G, superheat the steam in the coil of pipe S; and in order to control the amount of heat reaching the superheating-coil of pipe S while the air-blast is on, we provide a shield-damper, $d$, provided with openings, over which slide tile-dampers $d'$, by means of a rod, $i$, the portions of said rod within the chamber protected by cylindrical tiles $t'\ t'$.

The operation is the same as with other apparatus having the general characteristics of this one.

Having thus described our invention, what we claim as new, and desire to secure by Letters Patent, is—

1. The generator A, provided with the central chamber, B, and the superheater A', provided with a central downward flue, $F^2$, and a series of uptake-flues, F F, in combination with air-pipe T, passing around flues F F in a vertical return-coil, and thence into ash-pit $a$, as specified, and for the purpose set forth.

2. The superheater having uptake-flues F F, and return-flue $F^2$, and chamber G, in combination with superheating steam-pipe S, having a return-coil near the bottom of said chamber G, and terminating within pit $a$, and shield-damper $d\ d'$, arranged above said return-coil, all constructed, arranged, and operated as set forth.

JAS. E. LEADLEY.
JOHN HANLON.

Witnesses:
JOS. HENGELBROK,
M. J. BOYD.